Oct. 1, 1968  R. L. BERRETH ET AL  3,403,527
TRANSVERSE-PARALLEL FLOW CRYOGENIC FREEZER
Filed June 1, 1967  6 Sheets-Sheet 4

United States Patent Office 3,403,527
Patented Oct. 1, 1968

3,403,527
TRANSVERSE-PARALLEL FLOW CRYOGENIC FREEZER
Raymond L. Berreth, Allentown, Roger A. Howells, Orefield, David J. Klee, Emmaus, and Keith A. Miller, Allentown, Pa., assignors to Air Products and Chemicals, Inc., Allentown, Pa., a corporation of Delaware
Filed June 1, 1967, Ser. No. 642,751
27 Claims. (Cl. 62—266)

ABSTRACT OF THE DISCLOSURE

Apparatus for cooling articles to low temperatures such as the flash freezing of articles of food, including structure forming an elongated passageway and means for conveying the articles through the passageway for heat interchange with cold recirculating vapor and then with liquefied normally gaseous material sprayed directly on the articles to cool the articles to the low temperature and effect vaporization of the liquefied material. The vaporized liquefied material flows through the passageway in countercurrent relation to the direction of movement of the articles and provides the recirculating vapor.

Background of the invention

This invention relates to improvements on apparatus for cooling articles to low temperatures including apparatus for freezing food.

Processes are known in the art for cooling articles to and below their freezing temperature by the use of liquefied normally gaseous material such as liquid nitrogen. Such processes have been utilized for freezing articles of food and have made it possible not only to more rapidly freeze food and improve the characteristics of the product but to broaden the variety of foods that may be processed by freezing. Prior apparatuses for performing such processes include an elongated passageway defined by insulated walls and a conveyor for moving the articles to be frozen through the passageway. Within the passageway, at a region of the movement of the articles through the passageway ordinarily close to the exit end of the passageway, the articles are directly sprayed with liquefied gaseous material. In order to recover at least a part of the available refrigeration of the resulting vaporized gaseous material, the prior apparatuses provide means to flow the vapor through the passageway in countercurrent relation with the direction of movement of the articles on their way to the spraying region and, since the heat exchange efficiency between the vapor and the articles is inherently low, systems including a gas circulation fan are provided for recirculating the vapor in a somewhat confined zone through which the articles pass on their way to the spraying region. Apparatus employing such vapor recirculation principle are the most efficient of the prior apparatus in terms of pounds of food frozen per pound of refrigeration utilized.

Prior apparatuses employing the vapor recirculation principle utilized special ductwork and/or fan means for effecting the vapor recirculation. Such prior apparatuses are capable of providing continuous operation for acceptable periods of time under normal conditions; however, the efficiency and, in fact, the periods of operability of such apparatuses are severely limited during operations in a high moisture content environment when processing wetted articles of food or articles possessing a high moisture content such as sliced tomatoes, for example. During such operations, due to the low temperatures involved, the moisture will precipitate as frost and, because of certain inherent characteristics of the special ductwork and fan means utilized in the prior apparatuses for effecting the vapor recirculation, the precipitated frost will accumulate at critical points in the ductwork and on and about the fan means in such a manner as to gradually decrease the efficiency of the vapor recirculation process after the operation begins and render the vapor recirculation process ineffective within an undesirably short period of operation, as compared to normal operations in a low moisture environment. It has been determined that the foregoing difficulties may be overcome by the utilization of a novel vapor recirculation system provided by the present invention. Accordingly, it is an object of the present invention to provide novel apparatus utilizing the vapor recirculation principle for cooling articles to and below freezing temperature including fast freezing of articles of food which is capable of operating at high efficiency for extended periods of time even in a high moisture content environment.

It has been determined that a prior type of fan means and ductwork for effecting vapor recirculation, referred to herein as "parallel fan system" and described in detail hereinafter, provides a high order of heat exchange efficiency between the recirculating vapor and the articles to be cooled; however, the parallel fan system is subject to the frost accumulation problem discussed above. Another feature of the present invention is the discovery that the combination including a novel vapor recirculation system provided by the present invention and a parallel fan system may be used to process articles of high moisture content without detrimental frost accumulations in the parallel fan system and thereby obtain the high efficiency of the latter system. It is accordingly another object of the present invention to provide a novel apparatus including a plurality of vapor recirculation systems, at least one of which comprises a parallel fan system, which provides high efficiency for extended periods of operation even when processing articles containing a high moisture content.

Other objects and features of the invention will appear from the following detailed description considered in connection with the accompanying drawings which disclose a preferred embodiment of the invention. It is to be expressly understood, however, that the drawings are designed for purposes of illustration only and not as a definition of the limits of the invention, reference for the latter purpose being had to the appended claims.

In the drawings, in which similar reference characters denote similar elements throughout the several views.

Figure 4:
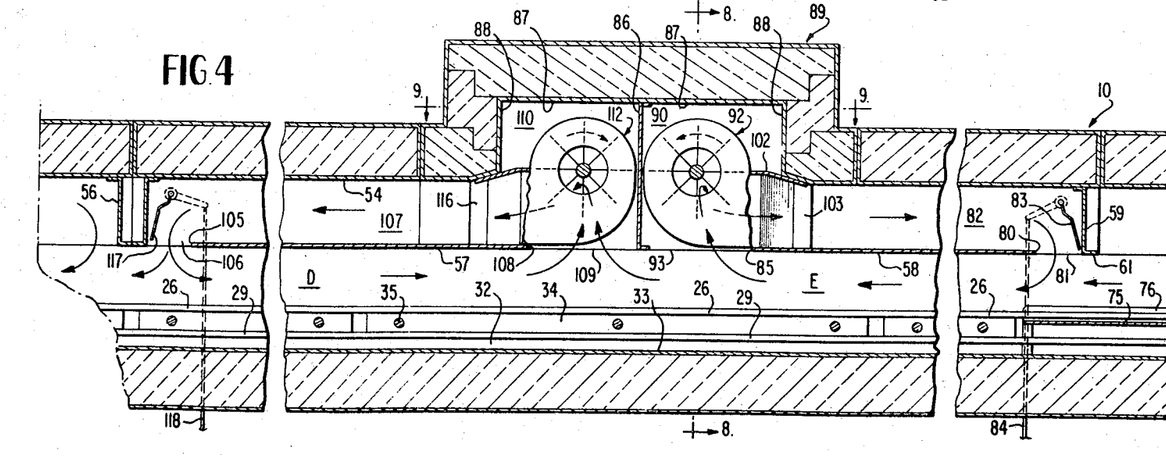
Figure 5:
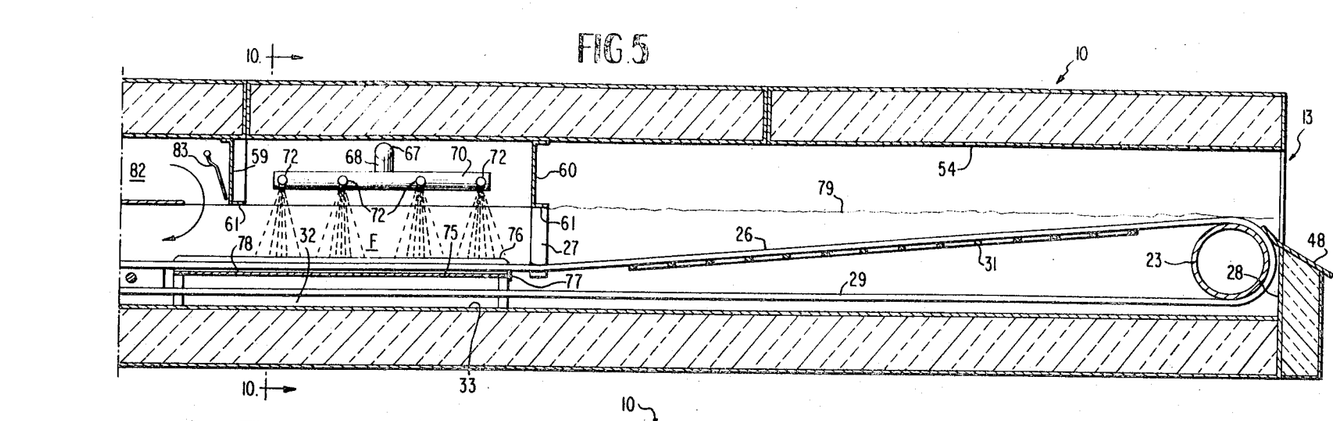
Figure 7:
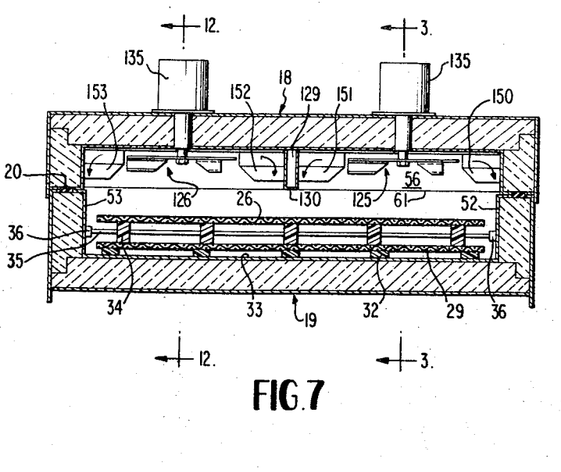
FIGURE 7 is a view, in section, taken along line 7—7 of FIGURE 3.
Figure 10:
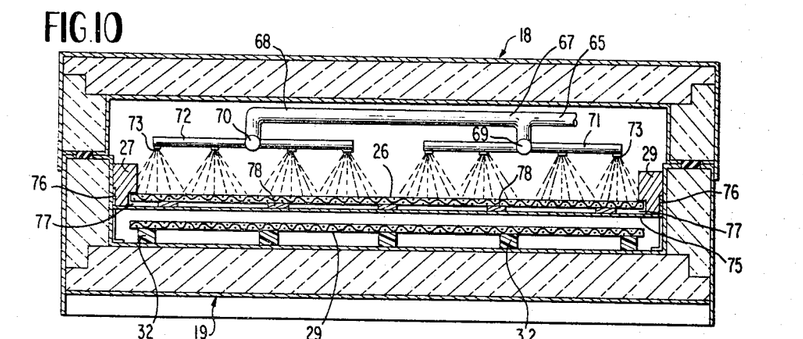
FIGURE 10 is a view, in section, taken along line 10—10 of FIGURE 5.

Although the present invention is disclosed in the drawings as a food freezing apparatus and described in the environment of food freezing, it is to be expressly understood that the principles of the present invention may be utilized to cool to low temperatures, including freezing temperatures, articles other than articles of food. With particular reference to FIGURES 1 through 5, the apparatus includes a hollow elongated structure 10, defining an elongated passageway 11 having an entrance opening 12 at its left-hand end and an exit opening 13 at its right-hand end, as viewed in the drawing, the structure 10 being supported by frame 14. The structure 10 insulates the passageway 11 and the walls of the structure 10 may include insulating material 15, such as polyurethane foam, sandwiched between an inner layer 16 and an outer layer 17 of sheet material such as stainless steel, for example. As seen from FIGURES 7 and 10, the passageway 11 is of generally rectangular cross-section and may be formed by an inverted, generally U-shaped section 18 and an erect, generally U-shaped section 19, joined together by any suitable clamping means, not shown, with suitable sealing means 20 inserted between the adjacent surfaces of the sections. The section 18 may be made up of a plurality of individually removable longitudinally extending portions, as shown, if desired. Conveyor means in the form of an endless belt 21, preferably constructed of mesh-like material, is provided for transporting articles along a path through the passageway 11 from the entrance opening 12 to the exit opening 13. The belt 21 is supported at opposite ends of the apparatus by rollers 22 and 23 and, as seen from FIGURE 7, the belt is of a width slightly less than the transverse dimension of the passageway 11. The roller 23 is rotated in a clockwise direction by motor 24 and drive means 25 to move the upper reach 26 of the belt in a direction from the entrance opening 12 to the exit opening 13. As seen in FIGURES 5 and 10, the upper reach 26 passes beneath transversely spaced blocks 27 and then follows an upwardly inclined path to the upper side of the roller 23 which lies in a plane below the exit opening 13 and above a transverse end wall 28 of the structure 10. The lower reach 29 of the belt is located within the passageway 11 and the only portions of the belt located outside of the passageway are those portions which extend to the left of the entrance opening 12, as viewed in the drawing, into the loading station 30 of the apparatus. This feature eliminates refrigeration loss that otherwise would result if the lower reach 29 of the belt followed a path outside the passageway or if a portion of the belt, when cold, passed outside the passageway such as by positioning the roller 23 outside the passageway beyond the exit opening 13. A lattice-type support 31 is located beneath the upper reach 26 between the transverse blocks 27 and the roller 23, and means are provided to support the upper reach 26 and the lower reach 29 and to maintain their respective horizontal parallel paths of movement through the passageway. As shown in FIGURES 2, 3, 4, and 5, the lower reach 29 is supported by a plurality of longitudinally extending, transversely spaced supports 32 positioned between the lower reach 29 and the bottom surface 33 and the upper reach 26 is supported on the lower reach by a plurality of longitudinally extending, transversely spaced supports 34 positioned between the upper and lower reaches. The supports 34 are maintained in the positions shown by transverse rods 35, the ends of which are received in U-shaped sockets 36 secured to the side walls of the elongated structure 10. The supports 32 and 34 are composed of low friction material such as ultra high density polyethylene.

Figure 1:
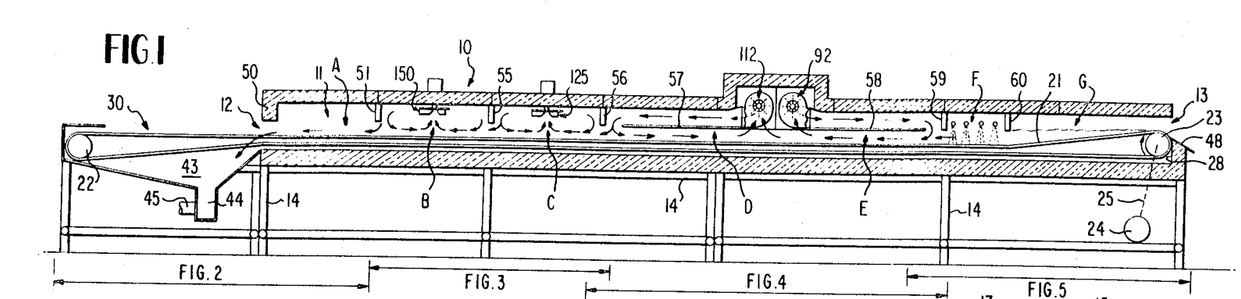
FIGURE 1 is a side view, in section, of a low temperature cooling apparatus embodying the principles of the present invention.
Figure 2:
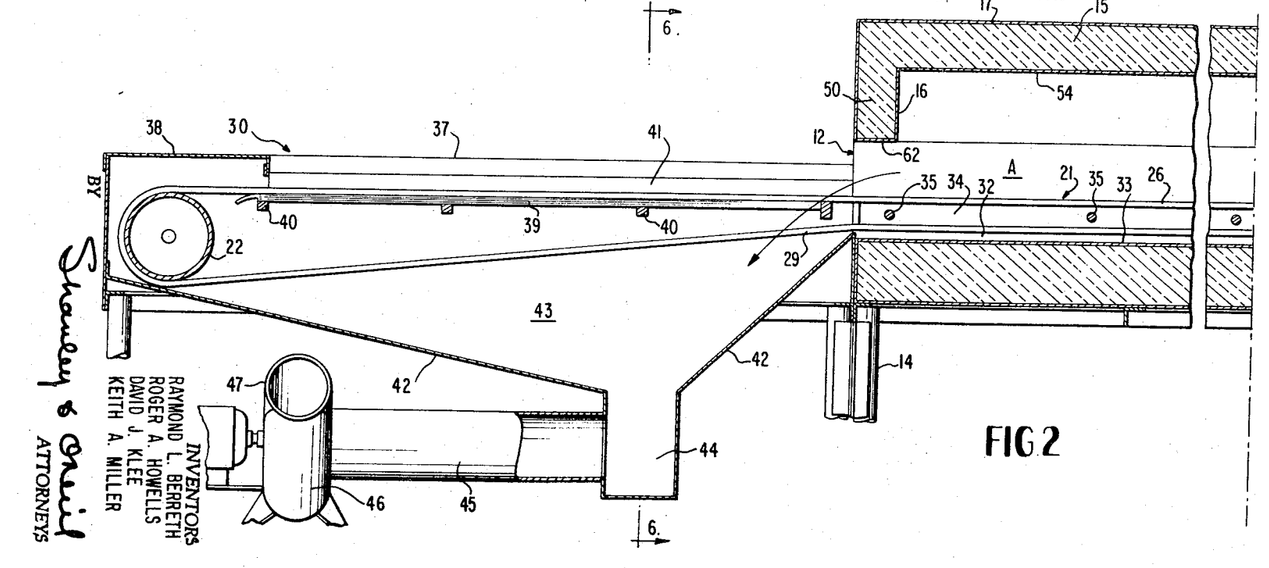
FIGURES 2, 3, 4, and 5 are enlarged views, in section, of portions of the apparatus of FIGURE 1.
Figure 3:
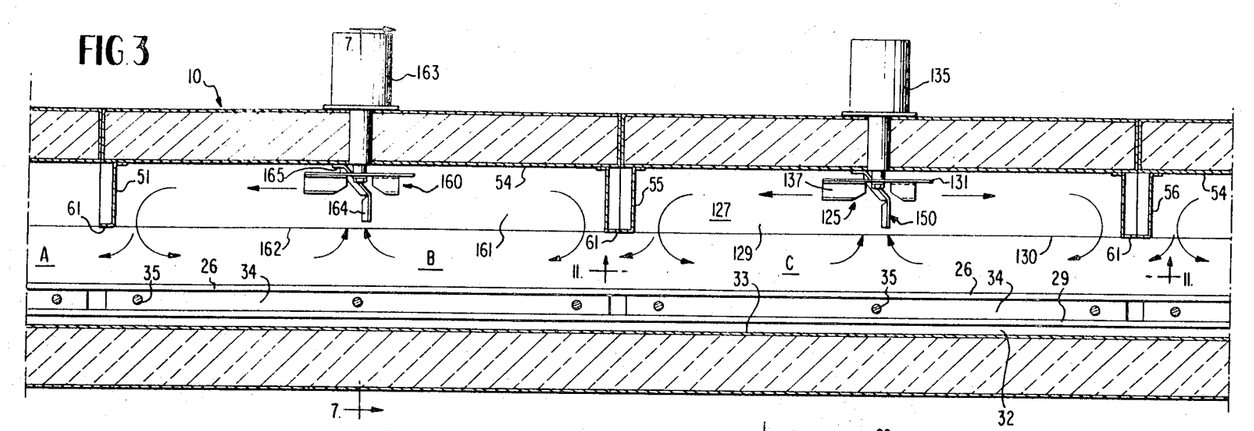
Figure 6:
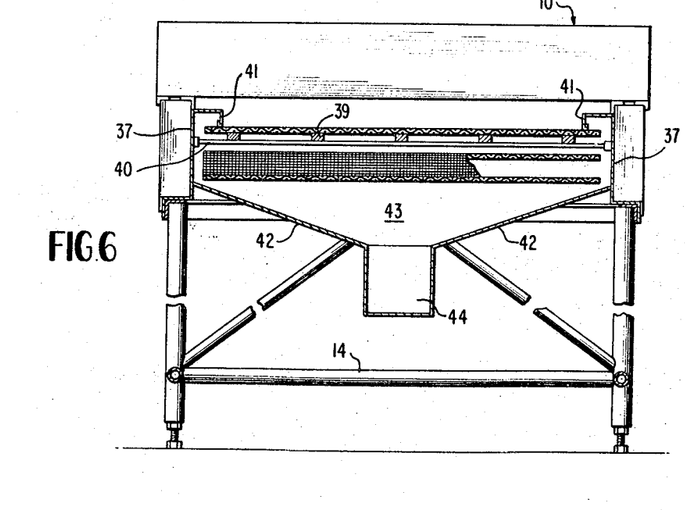
FIGURE 6 is a view, in section, taken along line 6—6 of FIGURE 2.

As shown, particularly in FIGURES 2 and 6, the loading station 30 includes a cabinet housing the roller 22 and having side walls 37 and a top surface 38 displaced from the entrance opening 12 to provide an unexposed length of the upper reach 26 of the belt immediately forward of the entrance opening 12 upon which articles to be processed may conveniently be placed. Longitudinally extending, transversely spaced members 39, carried by rods 40 supported by the side walls 37, provide a support for the exposed portion of the upper reach, and longitudinally extending strips 41, carried by the side walls 37, contact the marginal edges of the upper reach of the belt in the loading station to limit positioning of articles transversely of the belt to within the transverse distance between the blocks 27 and to prevent spillage of articles from the sides of the belt. The cabinet includes converging bottom walls 42 defining a vapor collection chamber 43 communicating with the passageway 11 through the entrance opening 12 and with an outlet 44 connected by conduit 45 to the inlet of a motor-driven blower 46 for removing vapor from the chamber 43 through the blower discharge conduit 47 which may discharge remotely of the apparatus. At the exit outlet of the passageway 11, a transverse plate 48 is provided beyond the roller 23 to remove articles from the belt and to direct articles from the passageway as the articles leave the conveyor belt as it moves around the roller 22.

The elongated passageway 11 is made up of a plurality of zones wherein different operations are performed on the articles in their movement through the passageway. With reference to the direction of movement of the conveyor through the passageway, the zones include an entrance zone A, vapor recirculation zones B, C, D, and E, liquid refrigerant contact zone F, and exit zone G. The entrance zone A extends from the entrance opening 12, which is formed by a downwardly depending end portion 50 of the structure 10, to longitudinally spaced baffle 51 which extends transversely of the passageway between the side walls 52 and 53 and depends downwardly from the top wall 54 of the structure 10. The vapor recirculation zone B extends from the baffle 51 to a longitudinally displaced, downwardly depending baffle 55 while the vapor recirculation zone C extends from the baffle 55 to a longitudinally spaced, downwardly depending baffle 56, the baffles 55 and 56 depending downwardly from the top wall 54 and transversely between the side walls 52 and 53. The vapor recirculation zones D and E are defined in part by horizontal baffles 57 and 58, respectively, each extending between the side walls 52 and 53 and each spaced above the upper reach 26 of the conveyor belt in parallel relation therewith. The refrigeration contact zone F is located beyond the zone E generally between longitudinally spaced, vertically disposed, downwardly depending baffles 59 and 60, and the exit zone G extends from the baffle 60 to the exit opening 13 of the passageway 11. The lower edges 61 of the baffles 51, 55, 56, 59, and 60 terminate in spaced relationship above the upper reach 26 of the belt and lie in a substantially common horizontal plane with the horizontal baffles 57 and 58, as well as the terminating edge 62 of the end portion 50, the common horizontal plane preferably passing through the contacting surfaces of the sections 18 and 19. The vertical space between the common horizontal plane and the top reach 26 of the belt is selected to provide the required clearance for passage of articles through the passageway. From the foregoing, it will be appreciated that the zones A, B, C, D, E, F, and G are each in fluid communication with its adjacent zone or zones and the terminating edge of the baffles 51, 55, 56, 57, 58, 59, and 60 comprises means forming passageways for such fluid communication.

The liquid refrigerant contact zone F includes means for spraying liquid refrigerant directly onto articles carried by the conveyor belt through the zone of the passageway between the baffles 59 and 60. As shown, such means includes a liquid refrigerant feed conduit 65 connected to a source of liquid refrigerant, not shown, located outside the structure 10 and, preferably, the conduit enters the passageway through a side wall of the U-shaped section 19. The conduit 65 is connected to dividing conduits 67 and 68 which feed manifolds 69 and 70, respectively. The manifolds 69 and 70 are each connected to a plurality of spray nozzle conduits 71 and 72, respectively, mounted side by side transversely of the passageway, the plurality of spray nozzle conduits 71 and 72 extending transversely of the direction of travel of the belt and are spaced longitudinally of the passageway. Each of the conduits 71 and 72 are provided with a plurality of liquid spray nozzles 73 spaced transversely of its length and, as shown in FIGURE 10, the spray nozzles 73 are designed to provide divergent overlapping spray patterns so that the spray from the nozzles of corresponding conduits 71 and 72 impinges upon the entire transverse dimension of the conveyor belt as it moves through the spraying zone. The spraying zone also includes a flat plate 75 extending transversely of the passageway between the side walls of the structure 10 and located beneath the upper reach 26 of the belt, the plate 75 extending longitudinally of the passageway substantially throughout the liquid refrigerant contact zone and partially into the vapor recirculation zone E. The sides of the plate are provided with upstanding longitudinal lips 76 and a transverse upstanding lip 77 is located along the edge of the plate 75 adjacent the baffle 60, the upper surface of the plate 75 being provided with a plurality of transversely spaced, longitudinally extending members 78 to space the top reach of the belt from the plate and permit the top reach of the belt to pass over the upper edge of the lip 77. The plate 75 and the upstanding lips 76 and 77 provide a tray for collecting liquid refrigerant that is not vaporized upon contact with the articles and which flows through the open mesh conveyor belt. For the most part, liquid refrigerant collected on the tray will vaporize and provide cold vapor for heat exchange, through the open mesh belt, with the underside of the articles resting on the belt. Liquid refrigerant that is not vaporized on the tray flows on the tray into the vapor recirculation zone E and is vaporized therein. It will be appreciated that the plate 75 and the members 78 perform the function of the supporting members 34 and the latter members are not required in the region of the liquid refrigerant contacting zone. As seen from FIGURE 5, cold vapor resulting from heat exchange between the sprayed liquid refrigerant and the articles in the liquid refrigerant spraying zone flows beneath the baffle 60 into the exit zone G and, due to its high density and the action of the transverse end wall 28 as a dam, the cold vapor collects in the lower portion of the exit zone below a horizontal surface indicated by reference character 79. The high density vapor collecting in the lower portion of the exit zone in combination with the baffle 60 functions as a seal at the exit end of the passageway to isolate the passageway from the influx of atmospheric air through the exit opening 13. In the exit zone, the inclination of the upper reach 26 is such as to prevent sliding of articles and movement of articles through the zone aids in the articles attaining a more uniform temperature throughout their entire mass.

Figure 8:
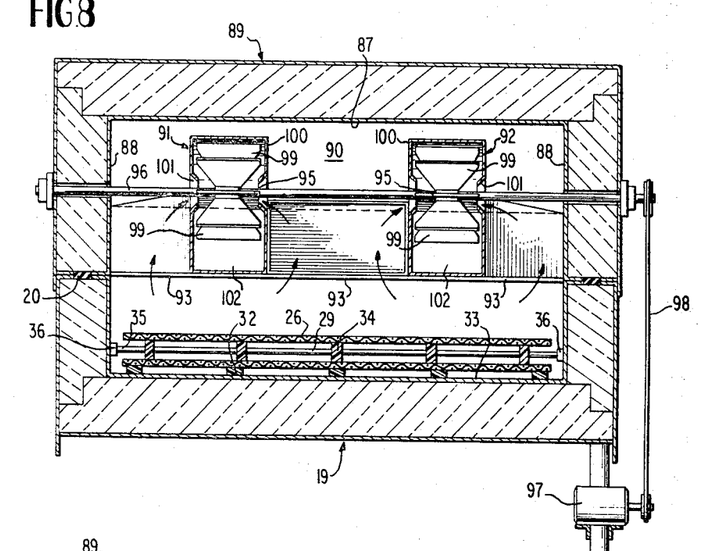
FIGURE 8 is a view, in section, taken along line 8—8 of FIGURE 4.
Figure 9:
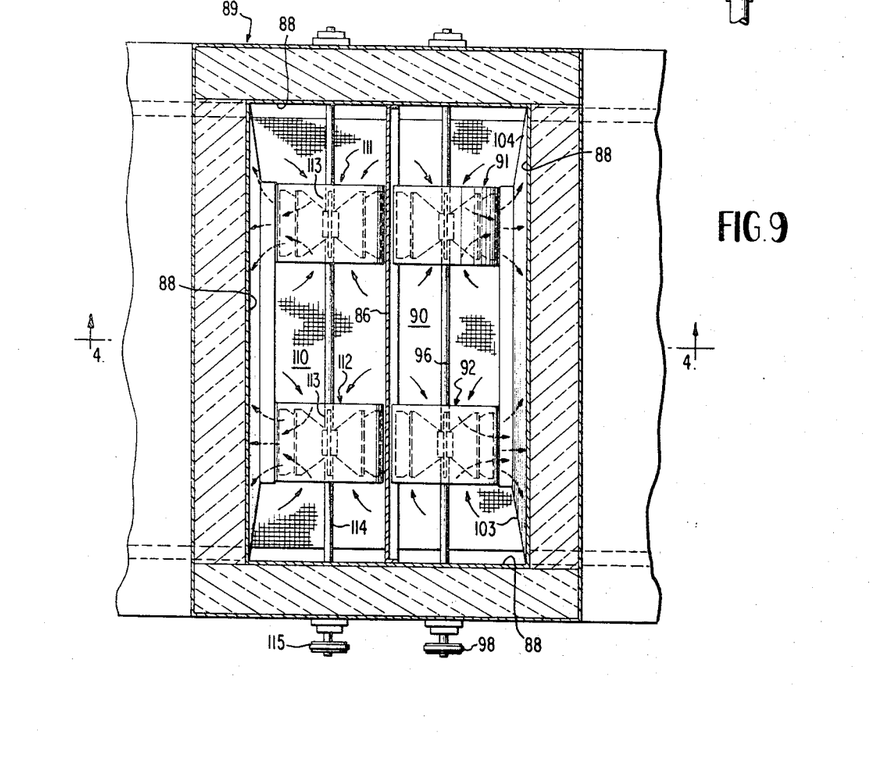
FIGURE 9 is a view, in section, taken along line 9—9 of FIGURE 4.

The vapor recirculation zones D and E each employ a "parallel fan system," referred to above, for effecting vapor recirculation. Such systems are so named because the vapor is recirculated along a path parallel to the direction of movement of the articles, the direction of vapor flow being either concurrent or countercurrent to the direction of movement of the articles. As shown in FIGURES 4, 8 and 9, the horizontal baffle 58 has a terminating edge 80 in spaced relation with the vertical baffle 59 to provide a transversely extending opening 81 between the zone E and a duct 82 formed by the top wall 54 of the structure 10 and the baffle 58, the opening 81 being provided with a damper 83 which may be manually adjusted or operated remotely by linkage means 84. The other end of the horizontal baffle 58 terminates at edge 85 spaced longitudinally from a vertical wall 86. The vertical wall 86, together with the top wall 87 and the side walls 88 of a vertical extension 89 of the structure 10, defines a chamber 90 within which is located a pair of parallel flow fans 91 and 92 transversely spaced from each other and from the side walls of the structure 10, the chamber 90 being in vapor communication with the zone E through openings 93 between the baffle edge 85 and the vertical wall 86. The parallel fans 91 and 92 each include a fan wheel 95 mounted on a common shaft 96 rotatably supported in the side walls of the structure 10 and rotated by motor 97 through belt and pulley drive 98. Each of the fan wheels 95 includes a plurality of radially extending blades 99 positioned parallel to the axis of rotation of respective fan wheels. The parallel fans also include a housing 100 having a circular inlet 101 on both sides about the shaft 96 and a discharge duct 102, the discharge ducts 102 being connected by widely diverging walls 103 and 104 to the duct 82. With this arrangement, as indicated by the arrows, the discharge from the parallel fans 91 and 92 flows into the duct 82 and through the opening 81 and then into the zone E in parallel countercurrent flow relative to the direction of movement of the articles on the conveyor belt, and then through the openings 93 into the chamber 90 and then into the openings 101 of the fans 91 and 92.

The vapor recirculation zone D also incorporates a "parallel fan system" which is similar to the parallel fan system of zone E described above; however, the system for zone E is arranged to establish concurrent flow between the recirculating vapor and the articles moving through the passageway on the conveyor belt. As shown, the horizontal baffle 57 terminates at edge 105 in spaced relation with the vertical baffle 56 to provide a transverse opening 106 between the zone D and a duct 107 formed between the horizontal baffle 57 and the top wall 54 of the structure 10. Also, the other end of the horizontal baffle 57 terminates in edge 108 in spaced relation from the vertical partition 86 to form a plurality of openings 109 communicating with a chamber 110 formed by the partition 86 and the top and side walls of the vertical extension 89. The chamber 110 houses a pair of parallel flow fans 111 and 112 similar to the fans 91 and 92 described above and similar reference characters denote corresponding parts. The fan wheels are mounted on a common shaft 114 rotated by a motor, not shown, through a suitable pulley-belt arrangement 115. The discharge of the fans 111 and 112 is conducted by means including divergent walls 116 into the duct 107. The opening 106 may be controlled by an adjustable damper 117 positioned through operation of linkage 118. As indicated by the arrows, the flow from the discharge of the parallel fans 111 and 112 is through the duct 107, the opening 106, through the zone D in parallel concurrent relation with the direction of movement of the articles on the conveyor belt and then through the openings 109 into chamber 110 and then through the fan inlets to the fans 111 and 112.

The vapor recirculation zone C utilizes a novel vapor recirculation system provided by the present invention which makes it possible to achieve the various aforementioned objects of the invention as will be described in detail below. The novel vapor recirculation system may be referred to as a "radial fan system" and, as shown in FIGURES 3, 7, 11 and 12 of the drawings, includes a pair of radial flow fans 125 and 126 mounted transversely of the passageway substantially equally distant between the vertical baffles 55 and 56. The fans 125 and 126 are mounted in open-bottomed compartments 127 and 128, respectively, which are defined by the top surface 54 of the structure 10, the transverse vertical baffles 55 and 56, opposite side walls 52 and 53 of the structure 10, and a vertically disposed baffle 129 positioned intermediate the side walls 52 and 53 and extending longitudinally of the passageway between the baffles 55 and 56, the baffle 129 defining a common wall of the compartments and having a terminating edge 130 lying in the horizontal plane of the terminating edges of the baffles 55 and 56. The fans 125 and 126 are of identical construction and corresponding elements are identified by similar reference characters. The fan 126, shown in detail in FIGURE 12, includes a flat, circular plate 131 supported at its center on a shaft 132 positioned perpendicular to the plane of the plate. The shaft 132 is vertically disposed and extends upwardly, as viewed in the drawing, through an opening 133 provided in the structure 10 and is coupled to a shaft 134 of an electric motor 135 mounted on the structure 10 externally of the passageway 11. The shaft 132 is of a length to position the top surface 136 of the plate 131 in close spaced relation with the top wall 54 and the plate 131 rotates in a horizontal plane parallel to the top wall 54. Blades 137, 138 and 139 of planar shape are mounted on the bottom side 140 of the plate in perpendicular relation with the plane of the plate and each blade extends radially from a central region of the plate outwardly to the periphery of the plate, the blades being disposed in approximately 120° relative relationship. The inlet flow to the fan is in a direction toward the blades parallel to and about the axis of rotation and the discharge flow is radially outwardly of the blades in a direction perpendicular to the axis of rotation. Each of the blades 137, 138 and 139 may include a flange 141 extending along respective unsupported edges and projecting therefrom, parallel to the plane of the plate, in the direction of rotation of the plate, to insure outward radial flow along the blades. Also, in the region of the inlet, the blades preferably include a non-flanged edge 142 inclined in a direction toward the axis of rotation.

Figure 12:
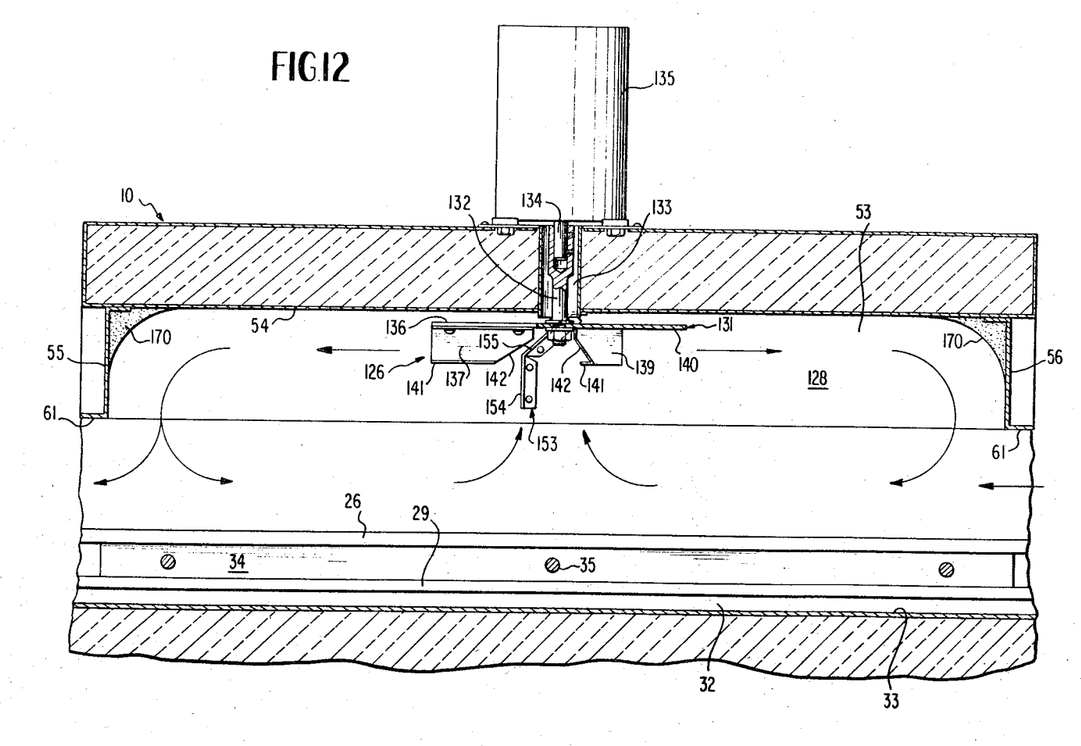
FIGURE 12 is an enlarged showing of a novel vapor recirculation system provided by the present invention.

It will be appreciated that the fan 126 being mounted within the compartment 128 is disposed above the horizontal plane passing through the terminating edges 61 of the baffles 55, 56 and 129. Accordingly, the discharge flow of vapor from the fan 126 outwardly of the blades, extending 360° about the fan and perpendicular to the axis of rotation of the shaft 132, is parallel to the top wall 54 and is in a direction toward the side walls of the compartment, i.e., the baffles 55, 56 and 129 and the side wall 53 of the structure 10. The flow pattern of the discharge will expand slightly in a direction parallel to the axis of rotation as the flow proceeds away from the fan. According to the present invention, the terminating edges 61 of the baffles 55 and 56 are located a distance below the fan 126, as viewed in the drawings, when considering the discharge flow characteristics of the fan 126 and the longitudinal distance between the fan and the baffles 55 and 56, to insure that the vapor discharged from the fan impings upon the baffles 55 and 56 and does not pass beneath the terminating edges 61. The side walls of the compartment 128 deflect the flow of vapor downwardly, as viewed in the drawing, in a direction toward and into the zone C and, due to the suction created by the fan, the vapor flows through the zone C radially inwardly across the upper reach 26 of the conveyor belt toward a region located below the fan and about the axis of rotation, and then upwardly, as viewed in the drawing, into the inlet area of the fan. Since the longitudinal dimension of the compartment 128 is greater than its transverse dimension, the upper horizontal flow paths within the compartment and the lower horizontal flow paths within the zone C will have a greater longitudinal dimension.

Figures 11, 13:
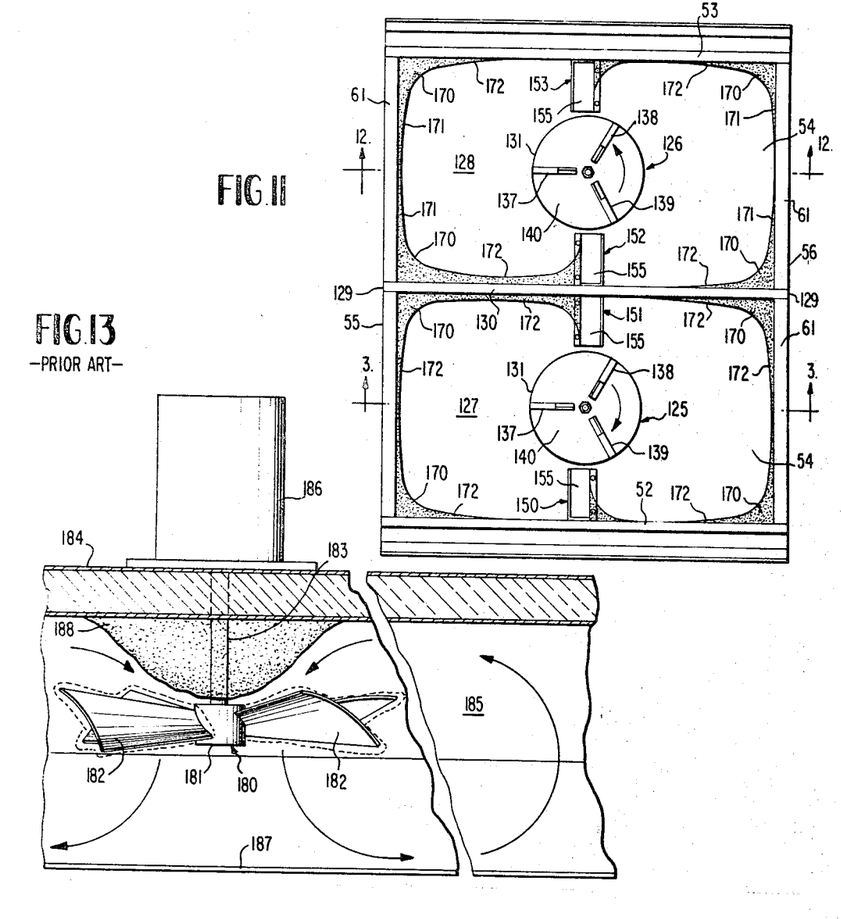
FIGURE 11 is a view, in section, taken along line 11—11 of FIGURE 3.
FIGURE 13 is a diagrammatic showing of an axial flow vapor recirculation fan arrangement of the prior art.

The above-described flow pattern in the chamber 128 and the zone C will generally define an elongated toroid and, due to the component of rotation imposed by the rotating blades, spiral flow paths will exist and the elongated toroidal pattern will rotate about the axis of rotation of the fan. For reasons that will be discussed below, a rotating toroidal flow pattern presents disadvantages and the present invention provides a novel arrangement which operates upon the discharge of the radial fans 125 and 126 to minimize spiral flow paths and prevent the building up of a rotation of the flow pattern about the axes of rotation of the fan. As shown in FIGURE 11, the compartments 127 and 128 are each provided with a pair of flow deflectors 150, 151 and 152, 153, respectively, positioned on opposite sides of the fan and preferably secured to the side walls 52 and 53 and the baffle 129 in a plane transversely of the passageway. The flow deflectors in each chamber are positioned in reverse relationship but otherwise the flow deflectors are of similar construction including a lower, vertically disposed planar member 154 and an upper planar member 155 disposed at an angle inclined in a direction opposite the direction of rotation of the fan. Both planar members 154 and 155 of each flow deflector project outwardly in perpendicular relation from the side walls 52, 53 or the baffle 129 and terminate in close spaced relation with their respective fan.

The vapor recirculation zone B incorporates a radial fan system identical to the radial fan system of the vapor recirculation zone C described above. The system of zone B includes a pair of transversely disposed radial flow fans 160 each mounted in an open-bottom compartment defined by the top wall 54 and the side walls 52 or 53 of the structure 10, baffles 51 or 55, and a transverse baffle 161 depending vertically downwardly from the wall 54 intermediate the side walls of the structure 10 and longitudinally between the baffles 51 and 55, the baffle 161 having a terminating edge 162 lying in the plane of the terminating edges 61 of the baffles 51 and 55. The radial fans 160 are driven by externally mounted motors, such as motor 163, and a pair of deflectors 164, 165 are positioned on diametrically opposite sides of each fan in a plane transversely of the passageway. Zone A, which extends a substantial distance longitudinally of the passageway 11, is a non-recirculation zone which functions to isolate the zone B from the entrance opening 12 to prevent air infiltration into the passageway.

As mentioned above, one of the objects of the present invention is to provide a novel apparatus for cooling articles to low temperatures that is capable of operation at high efficiency for extended periods of time even in an environment of high moisture content such as when freezing wet or warm articles of food. This object is achieved by the provision of a freezing apparatus including one or more radial fan systems of the type described above and embodied in zones B and C. The novel radial fan system provided by the present invention is uniquely characterized in that its efficiency is substantially unimpaired by the accumulation of precipitated frost and is operable for extended periods of time in a high moisture environment. When a recirculation system is operating on vapor containing precipitated frost, the frost may collect and build up on portions of the system onto or over which the vapor is flowed. It will thus be appreciated, by reference to FIGURE 12, that the type of radial flow fan provided by the present invention is so charcterized that frost will not accumulate about the driveshaft 132 or between the plate 131 and the adjacent top wall 54. Furthermore, the planar configuration of the blades 137, 138 and 139 and the outward radial flow therealong tends to minimize frost accumulations on the blades and the blades will remain frost-free when rotating at a sufficiently high angular velocity. In operation of an apparatus employing radial flow fans of the type herein disclosed with the circular plate having a diameter of 12½ inches and rotating at 1725 revolutions per minute, there existed no visible accumulations of frost on the blades after 11 hours of operation in a high moisture environment resulting from the freezing of cooked shrimp. In any event, however, frost accumulations on the planar blades will be substantially uniform and will not alter the flow characteristics of the fan and not materially decrease its efficiency. The open bottom compartment within which the radial fan is mounted functions to remove frost from the recirculating vapor and collect the frost within the compartment in such a manner as not to affect the efficiency of the vapor recirculation system. The precipitated frost is deposited from the recirculating vapor and collects in the regions of the compartment where the side walls join with the top wall, primarily at the longitudinal ends of the compartment. As shown in FIGURE 12, typical frost accumulations 170 are shown in the corners of the compartment formed between the top wall 54 and the baffles 55 and 56, respectively, the frost accumulation extending in decreasing thickness downwardly on the baffles toward their terminating ends 61 and along the top wall 54 in a direction toward the radial fan. Also, as seen from FIGURE 11, the frost accumulations include portions 171 extending transversely along the baffles 55 and 56 and portion 172 extending longitudinally along the side walls 52 and 53 and the transverse baffle 129. It will be appreciated that the frost accumulations 170, 171 and 172 have no adverse effect upon the efficiency of the vapor recirculation system and actually improve the vapor flow due to the streamlining effect of the accumulations. In extended periods of operation, especially in heavy moisture laden environments, frost accumulations of a thickness greater than that shown in the drawings may exist and may extend over a greater area of the top wall 54 without material decrease in efficiency since such frost accumulations do not alter the normal flow pattern of the radial fan recirculation system. In addition to the frost accumulations shown on the drawings, frost will accumulate on and about the flow deflectors; however, such frost accumulation is not disadvantageous but actually aids in eliminating or minimizing the rotational component of the flow pattern about the axis of rotation of the fan.

The advantages obtained by radial fan systems provided by the present invention will be appreciated more fully from a consideration of prior vapor recirculation systems employed in freezing apparatus; such prior systems include parallel fan systems of the type embodied in zones D and E, and axial fan systems. It has been determined from actual operations that both the parallel fan system and the axial fan system are so characterized that their vapor recirculation efficiency progressively decreases when operating in a high moisture environment due to frost accumulations which in time may actually effect stoppage of the vapor recirculation process. When vapor containing precipitated frost is recirculated in a parallel fan system, such as the system associated with zone E of FIGURE 4, it has been determined that frost collects at the end of the duct 82 adjacent the opening 81 and the frost accumulation reduces and eventually blocks the flow of vapor through the latter opening even if a damper 83 is not employed. Also, the frost accumulates about the inlet openings 101 to the fan and also about the rotor 95 and on the blades 97; such frost accumulations materially decrease the mass of vapor circulated through the fan within a relatively short period of time and may eventually block the fan inlet. A typical axis fan system provided by the prior art is shown in FIGURE 13 including an axial flow fan 180 having a hub 181 carrying blades 182, the hub being mounted on a vertically disposed shaft 183 passing through the upper wall 184 of a passageway 185 and driven by an externally mounted motor 186. A conveyor belt 187 is provided in the passageway 185 beneath the fan 180 for transporting articles through the passageway; the belt extending transversely between the side walls of the passageway and moving longitudinally thereof. The inlet flow of an axial flow fan is at the upper side of the fan 180, as viewed in the drawing, that is, the side of the fan adjacent the top wall 184, and the discharge flow is downwardly toward the conveyor 187. Beneath the fan and above the conveyor, the flow is radially outwardly, generally parallel to the conveyor, then upwardly toward the top wall 184 and then radially inwardly toward the inlet side of the fan. The flow pattern of an axial fan requires the fan 180 to be spaced a substantial distance below the upper wall 184 and, due to the low pressure existing at the fan inlet, frost will precipitate and collect on the upper wall and about the shaft 183 and in a relatively short period of time build up to a large accumulation 188 which blocks the flow of vapor to the inlet of the fan. In addition, frost will accumulate on the blades 182 to such an extent that the vapor recirculation will be drastically reduced and the fan will become unbalanced setting up vibrations that may eventually cause bearing failure. An additional disadvantage of the axial fan system is that the height of the tunnel must be increased to provide the required vertical space between the inlet side of the fan and the top wall of the passageway, which increases heat leak into the passageway. Also, like the radial fan, the flow pattern of the axial fan system includes a rotational component about the axis of rotation of the fan, the disadvantages of which will be described below; however, unlike the novel radial fan system provided by the present invention, it is not possible to eliminate such rotational component in the axial flow system by apparatus that will not accumulate frost and drastically reduce the vapor recirculation.

Other features and advantages of the novel apparatus provided by the present invention and the manner the various objects of the invention are achieved will be appreciated more readily by considering a typical operation of the apparatus. Articles to be frozen at a temperature of about 80° F. are placed on the open expanse of the conveyor belt at the loading station 30 and such articles are carried by the belt successively through the zones A, B, C, D, E, F, and G and leave the exit opening 13. In the zone F, liquid refrigerant, such as liquefied nitrogen, is sprayed directly onto the articles to effect cooling of the articles to about −10° F. and the articles, upon passing through the zone G, attain an average temperature of about −10° F. Considering equilibrium operating conditions in which nitrogen vapor is recirculated in the zones B, C, D, and E, nitrogen vapor resulting from the heat interchange in the zone F flows beneath the baffle 59 into the zone E and is recirculated in the zone E by the parallel fan system resulting in flow of cold vapor, uniformly across the passageway, in parallel, countercurrent heat exchange with the articles. The temperature of the nitrogen vapor in the zone E is at about −125° F. with about a 10° F. temperature difference between the vapor at the inlet and outlet of the zone. Vapor from the zone E passes beneath the partition wall 86 and enters the vapor recirculation system of zone D through the openings 109 and the parallel fan system of zone D recirculates the cold nitrogen vapor through the zones D in concurrent heat exchange with the articles, the flow being uniform transversely of the passageway and in parallel relation to the movement of the articles. The temperature of the nitrogen vapor recirculated in the zone D is at about −60° F., with a temperature difference of about 5° F. between the inlet and outlet of the zone. Nitrogen vapor flows from the zone D beneath the baffle 56 into the zone C and therein the nitrogen vapor is recirculated by the novel radial fan system provided by the present invention in a manner described above. The temperature of the vapor in the zone C is at about −10° F. and only a slight temperature difference will exist between the inlet and outlet of the zone. Vapor from the zone C flows into the zone B through the passageway beneath the baffle 55 and the vapor is recirculated in the zone B by the radial fan system, likewise in a manner described above, the temperature of the vapor in the zone C being at about +30° F. Nitrogen vapor leaves the zone C through the passageway beneath the baffle 51 and flows through the zone A and leaves the passageway through the entrance opening 12 primarily downwardly into the chamber 43 from which it is removed by the blower 44. The nitrogen vapor leaves the chamber A at a temperature of about 50° F. below the temperature of the articles entering the apparatus, that is at about 30° F. for the foregoing example. In the chamber A, the initial cooling of the articles may occur; however, the chamber A functions primarily to isolate the first recirculation zone B from the ambient atmosphere. The temperature of the articles is gradually reduced as they move through the vapor recirculation zones B, C, D, and E, and the articles enter the spraying zone F at about +25° F. At the time the articles reach the zone F, about 50% of the total heat removed from the articles leaving the exit opening 13 has been effected.

The cold nitrogen vapor recirculated in the zones B,

C, D, and E flows downwardly in heat interchange with the sides of the articles and through the interstices of the upper reach 26 of the mesh-like belt and into and through the spaces below the upper reach 26 between the members 34 to effect cooling of the underside of the articles. In addition, the cold lower reach 29 moving in a direction toward the entrance opening 12 performs a regenerative function and provides refrigeration in the regions of the passageway beneath the upper reach 26. These features obtain uniform cooling of the articles inwardly of their surfaces and materially aid in achieving extremely high overall efficiencies which have been experienced in commercial operations on apparatus embodying the principles of the present invention.

When the system attains equilibrium conditions, a constant mass of nitrogen vapor will be recirculated in each of zones B, C, D, and E; however, the mass of recirculated vapor may differ between the various zones depending at least in part upon the size or capacity of respective vapor recirculation systems and adjustment of variables including fan speed and damper position. In any event, a constant quantity of nitrogen vapor will flow through the zones E, D, C, and B, in the order named; the quantity of nitrogen vapor will correspond to the quantity of nitrogen vapor produced upon vaporization of the liquid nitrogen upon direct heat interchange with the articles in the zone F and upon vaporization of excess liquid nitrogen falling on the plate 75. Such controlled flow of nitrogen vapor through the zones E, D, C, B, and A in countercurrent relation with the movement of the articles through the passageway prevents any appreciable flow of nitrogen vapor from the zone F, through the zone G and out the exit opening 13 and maintains the mass of cold nitrogen vapor in the zone G, below the line 79 of FIGURE 5.

The quantity of nitrogen vapor flowed from one vapor recirculation zone to the next in countercurrent relation to the direction of movement of the articles through the pasageway depends upon a number of factors including the physical dimensions of the zones, the size of the entrance and exit passageways of the zones and the speed of rotation of the fan circulating means associated with the zones. The quantity of nitrogen vapor flow may be controlled by adjusting the position of the dampers 83 and 117 and/or the speed of rotation of the parallel fans. For example, the parallel fans 91 and 92 may be operated at low speed and the parallel fans 111 and 112 operated at relatively high speed with the damper 117 adjusted to control the discharge from the fans 111 and 112 so that the mass of nitrogen vapor leaving the zone D through the passageway beneath the baffle 56 corresponds to the mass of nitrogen vapor entering the zone E through the passageway beneath the baffle 59. A fine control may be achieved by adjusting the position of the damper 83 to increase or decrease the flow of nitrogen vapor to the fans 111 and 112. Also, the controlled flow of nitrogen vapor to the zone E and from the zone D may be achieved without the use of dampers by driving the fans 91 and 92 with variable speed motors. The controlled mass of nitrogen vapor flowing from the zone D to the zone C through the passageway beneath the baffle 56 effects the flow of nitrogen vapor from the zone C to the zone B through the passageway beneath the baffle 55 and from the zone B to the zone A through the passageway beneath the baffle 51 and the novel radial fan systems are so characterized that the mass of nitrogen vapor flowing to and from the zones C and B corresponds to the mass of nitrogen vapor discharged from the zone D. A feature of the radial flow systems which obtains the foregoing result includes the flow deflectors associated with the radial fans such as the flow deflectors 150, 151, 152, and 153 associated with the radial fans 125 and 126. As described above, the normal flow pattern of a radial type fan positioned in an open-bottomed compartment possesses a component of rotation about the axis of rotation of the fan. Such swirling movement of the flow pattern would result in flow into and out of the zone, beneath the transverse baffle 55 of FIGURE 12, causing excess flow of vapor from the zones C and B and undesirable flow of ambient air into the passageway through such zones. In order to overcome that difficulty, the flow deflectors 150, 151, 152, and 153 are provided to interrupt the rotational component of the flow pattern so that the flow from the transverse baffles 55 and 56 is downwardly and inwardly toward the center of the zone and of substantial uniformity across the passageway. Accordingly, the flow of nitrogen vapor from the zone D to the zone C alone influences the flow of nitrogen vapor from the zones C and B and the flow of constant mass successively through the zones is achieved. It will thus be appreciated that the vapor recirculation system of zone D comprises means for effecting the flow of a predetermined mass of nitrogen vapor successively through the radial flow systems, zones B and C, in countercurrent relation to the direction of movement of the articles through the passageway. Also, the nitrogen vapor flows through the entrance opening 12 at substantially uniform velocity across its width and thus aids in precluding the influx of air into the passageway.

As mentioned above, another object of the present invention is to provide an apparatus including at least one parallel flow fan system that is capable of operating for extended periods of time in a high moisture environment. This object is achieved by the provision of an apparatus including one or more of the novel radial fan vapor recirculation systems provided by the present invention in combination with one or more parallel fan recirculation systems, in which the radial fan recirculation system functions to effectively remove and collect precipitated frost and thereby permit the parallel fan system to operate on vapor substantially free of precipitated frost. As seen from the drawings and as described above, the radial fan recirculation systems for the zones B and C are located in the pasageway 11 ahead of the parallel fan recirculation systems of the zones D and E with respect to the decreasing temperature of the articles moving through the passageway. By such arangement, all sources of moisture and, hence, precipitated frost, are removed and collected in the radial flow fan systems. The source of precipitated frost is from the articles being processed such as, for example, cooked or other articles of food containing a high moisture content; for reasons discussed above, there being very little if any influx of atmospheric air into the passageway through the inlet opening 12 and the outlet opening 13. The temperature conditions existing in the recirculation zones B and C are such that moisture precipitates as frost which intermingles with the recirculating vapor and collects in the open-bottomed compartments as described above. At lower temperatures as existing in the zones D and E, the surface of the articles is primarily depleted of moisture. Accordingly, the novel combination of a radial flow vapor recirculation system and a parallel fan vapor recirculation system in which the radial fan system operates at a relatively higher temperature makes it possible to obtain all of the advantages of the parallel flow systems while at the same time permitting extended periods of operation unaffected by precipitated frost resulting from a high moisture environment. It also will be appreciated that the provision of one or more novel radial flow systems as provided by the present invention, operating on vapor of temperatures at which moisture precipitates as frost, overcomes frost accumulation problems irrespective of the type of vapor recirculation that may be used at lower temperatures which may comprise radial flow systems of the present invention. Thus, the present invention also provides an apparatus including a pluraliy of radial flow recirculation systems operating on vapor at progressively decreasing temperatures and means for effecting the flow of a constant mass of vapor successively through the radial flow recirculation system in countercurrent relation to the movement of the articles being processed.

There is thus provided by the present invention novel apparatus for cooling articles to low temperature including freezing temperature such as articles of food and, although various combinations and modifications of the apparatuses have been disclosed herein, it is to be expressly understood that various changes and substitutions may be made therein without departing from the spirit of the invention as well understood by those skilled in the art. For example, the number of fans in each zone may be varied depending upon the capacity of the apparatus. Thus, in place of a pair of fans in each zone as illustrated in the drawings, a single fan or more than two fans may be used. Also, the deflector vanes may be differently positioned relative to the transverse arrangement shown in the drawings and more than one pair of deflector vanes may be associated with each fan. Furthermore, when two or more transversely positioned radial flow fans are used in a zone, a common compartment may be provided for all of the fans; thus, the baffles 129 and 161 are not essential. Accordingly, reference will be had to the appended claims for a definition of the limits of the invention.

We claim:

1. Apparatus for cooling articles to low temperature comprising
   wall means forming an elongated passageway having internal top, bottom and side surfaces,
   the elongated passageway having an entrance opening at one of its ends for receiving articles into the passageway and an exit opening at the other of its ends for discharging articles from the passageway,
   conveyor means located in the lower portion of said passageway for transporting articles from the entrance opening through the passageway to the exit opening,
   refrigerant means located within the passageway inwardly of the exit opening for discharging liquefied normally gaseous refrigerant into heat exchange relationship with articles transported by the conveyor means to effect cooling of the articles with concomitant vaporization of the liquefied refrigerant to provide a source of cold vapor,
   at least one vapor recirculating means located in the passageway between the entrance opening and the refrigerant means for recirculating vapor in a defined zone of the passageway in heat interchange with articles moved by the conveyor means through the passageway,
   said vapor recirculation means including means forming an open-bottom compartment and a radial flow fan located within said open-bottomed compartment in spaced relation above said conveyor means,
   said radial flow fan comprising an open, non-encased rotor having blades extending radially outwardly from the rotational axis thereof,
   the flow pattern of cold vapor being first radially outward from the periphery of the rotor into contact with the compartment forming means and being deflected thereby into a second direction in heat exchange relationship with said articles to be cooled.
   and means for inducing the flow of cold vapor from said source through the defined zone in a direction from the refrigerant means to the entrance opening.

2. Apparatus for cooling articles as defined in claim 1, including
   means for blocking the flow of cold vapor from said source through the exit opening.

3. Apparatus for cooling articles as defined in claim 1 in which said radial flow fan includes planar blades
   said blades lying in radial planes passing through the rotational axis of said fan.

4. Apparatus for cooling articles as defined in claim 1 in which the means forming the open-bottomed compartment comprise
   baffles depending from the internal top surface of said wall means forming the passageway and extending transversely of the passageway,
   said baffles being spaced from the radial fan along the direction of movement of articles through the passageway on opposite sides of the radial fan, and
   said baffles terminating in surfaces lying in a plane in spaced relation above the conveyor means.

5. Apparatus for cooling articles as defined in claim 1 in which said vapor recirculation means includes means mounted in the compartment for modifying the flow pattern of said cold vapor discharged by said radial fan.

6. Apparatus for cooling articles as defined in claim 1 including deflector vanes located intermediate the periphery of the rotor and the point of heat exchange with the articles.

7. Apparatus for cooling articles as defined in claim 1 in which the conveyor means comprises
   a belt of mesh-like material including an upper reach and a lower reach extending through the passageway,
   and means for supporting the upper reach including first discontinuous supporting means supporting said upper reach, said first supporting means resting on and being supported by said lower reach, and second discontinuous supporting means supporting said lower reach.

8. Apparatus for cooling articles as defined in claim 1 wherein the conveyor means comprise
   a belt of mesh-like material including an upper reach and a lower reach extending through the passageway, and
   plate means extending parallel to and immediately below said upper reach, said plate means extending from the area of said refrigerant means to a point adjacent said vapor recirculating means whereby liquid refrigerant which is not vaporized in the area of said refrigerant means is vaporized in said defined recirculation zone.

9. Apparatus for cooling articles to low temperature comprising
   wall means forming an elongated passageway having internal top, bottom and side surfaces,
   the elongated passageway having an entrance opening at one of its ends for receiving articles into the passageway and an exit opening at the other of its ends for discharging articles from the passageway,
   conveyor means located in the lower portion of said passageway for transporting articles from the entrance opening through the passageway to the exit opening,
   refrigerant means located within the passageway inwardly of the exit opening for discharging liquefied normally gaseous refrigerant into heat exchange relationship with articles transported by the conveyor means to effect cooling of the articles with concomitant vaporization of the liquefied refrigerant to provide a source of cold vapor,
   a plurality of vapor recirculating means located in the passageway serially between the entrance opening and the refrigerant means for recirculating vapor in defined zones of the passageway in heat interchange with articles moved by the conveyor means through the passageway,
   at least two of said vapor recirculation means including means forming open-bottomed compartments and a radial flow fan located within each open-bottomed compartment in spaced relation above the conveyor means,
   each of said radial flow fans comprising an open, non-encased rotor having blades extending radially outwardly from the rotational axis thereof,
   the flow pattern of cold vapor being first radially outward from the periphery of the rotor into contact with the compartment forming means and being deflected thereby into a second direction in heat exchange relationship with said article to be cooled, and means for inducing the flow of cold vapor from said source successively through the defined recirculation zones in a direction from the refrigerant means toward the entrance opening.

10. Apparatus for cooling articles as defined in claim 9, including
means for blocking the flow of cold vapor from said source through the exit opening, 11. Apparatus for cooling articles as defined in claim 9 in which the radial flow fans include
a plurality of planar blades disposed adjacent the internal top surface of the wall means forming the passageway and mounted for rotation about an axis perpendicular to said internal top surface.

12. Apparatus for cooling articles as defined in claim 11 in which
said planar blades lie in radial planes passing through said axis.

13. Apparatus for cooling articles as defined in claim 9 in which the radial flow fan of each vapor recirculation means includes
a plate disposed adjacent the internal top surface of the wall means forming the passageway and extending parallel thereto, means mounting said plate for rotation about an axis perpendicunlar to said internal top surface,
and a plurality of blades mounted on said plate, said blades depending therefrom in a direction toward the conveyor means and extending radially of said axis.

14. Apparatus for cooling articles as defined in claim 13 in which each blade includes
a flange spaced from the surface of the plate and lying in a plane parallel to the surface of the plate.

15. Apparatus for cooling articles as defined in claim 9 in which the means forming said open-bottomed compartments comprise
baffles depending from the internal top surface of the wall means forming the passageway and extending transversely of the passageway,
said baffles being spaced from the radial fan on opposide sides thereof along the direction of movement of the articles, and
said baffles terminating in surfaces lying in a plane in spaced relation above the conveyor means.

16. Apparatus for cooling articles as defined in claim 15 in which the baffles are spaced from the periphery of the radial fan a distance at least equal to the radius of the radial fan.

17. Apparatus for cooling articles as defined in claim 16 in which each radial fan includes
a plurality of blades depending in a direction toward the conveyor means and terminating in a plane spaced from the conveyor means a distance greater than the terminating surfaces of the baffles.

18. Apparatus for cooling articles as defined in claim 17 in which said vapor recirculation means include
means mounted in the compartments for modifying the flow pattern of said cold vapor discharged by said radial fans.

19. Apparatus for cooling articles as defined in claim 18 in which the means for deflecting the flow of the discharge of the radial fan includes
deflector vanes located in the compartments on opposite sides of the radial fans,
said deflector vanes extending substantially between the internal top surface and the plane of the terminating surfaces of the baffles.

20. Apparatus for cooling articles as defined in claim 19 in which said deflector vanes include portions differently disposed relative to the axes of the radial fans.

21. Apparatus for cooling articles as defined in claim 19 in which the deflector vanes include first and second parts disposed in relative angular relationship.

22. Apparatus for cooling articles as defined in claim 9 in which the conveyor means comprises
a belt of mesh-like material including an upper reach and a lower reach extending through the passageway, and means for supporting the upper reach including first discontinuous supporting means supporting said upper reach, said first support means resting on and being supported by said lower reach, and second discontinuous supporting means supporting said lower reach.

23. Apparatus for cooling articles as defined in claim 9 wherein said conveyor means include an upper and lower reach,
plate means positioned immediately below and parallel to said lower reach, said plate means extending from the area of said refrigerant means to a point adjacent one of said vapor recirculation zones whereby liquid refrigerant which is not vaporized in the area of said refrigerant means is vaporized in said recirculation zone.

24. Apparatus for cooling articles as defined in claim 9 in which the means for inducing the flow of cold water from said source successively through the defined recirculation zones comprises
means forming at least one additional vapor recirculation zone system for recirculating vapor in a zone of the passageway along the direction of movement of articles immediately before the refrigerant means,
said additional vapor recirculation zone including means for receiving vapor from the source of cold vapor and for flowing vapor therefrom in a direction toward the entrance opening of the passageway.

25. Apparatus for cooling articles to low temperature comprising
wall means forming an elongated passageway having internal top, bottom and side surfaces,
the elongated passageway having an entrance opening at one of its ends for receiving articles into the passageway and an exit opening at the other of its ends for discharging articles from the passageway,
conveyor means located in the lower portion of said passageway for transporting articles from the entrance opening through the passageway to the exit opening,
refrigerant means located within the passageway inwardly of the exit opening for discharging liquefied normally gaseous refrigerant into heat exchange relationship with articles transported by the conveyor means to effect cooling of the articles with concomitant vaporization of the liquefied refrigerant to provide a source of cold vapor,
means forming first and second vapor recirculation zones located in series between said entrance opening and said source of cold vapor,
the means forming said first recirculation zone including an open, non-encased rotor having a center intake and a peripheral discharge, and having blades extending radially outwardly from the center,
the means forming said second recirculation zone including means forming elongated upper and lower passages extending parallel to the direction of movement of said conveyor means,
fan means for recirculating cold vapor in a substantially closed loop formed by said upper and lower passages, and
means for controlling the flow of cold vapor in the direction from said source through each of said recirculation zones toward said entrance opening.

26. The apparatus as claimed in claim 25 wherein the means forming said first recirculation zone further include
deflector vanes for modifying the flow pattern of the cold vapor discharged by said radial flow fan.

27. The apparatus as claimed in claim 25 wherein said radial flow fan is mounted for rotation about an axis perpendicular to said top surface, and baffle means surrounding said fan and forming an open-bottomed compartment.

References Cited

UNITED STATES PATENTS

| | | | |
|---|---|---|---|
| 1,933,257 | 10/1933 | Goosmann | 62—380 X |
| 3,277,657 | 10/1966 | Harper et al. | 62—63 |
| 3,298,188 | 1/1967 | Webster et al. | 62—63 |
| 3,315,480 | 4/1967 | Rich | 62—63 |

ROBERT A. O'LEARY, *Primary Examiner.*

W. E. WAYNER, *Assistant Examiner.*